United States Patent
Nukui

(10) Patent No.: US 12,110,249 B2
(45) Date of Patent: Oct. 8, 2024

(54) LONG GLASS FIBER MANUFACTURING METHOD, AND LONG GLASS FIBER

(71) Applicant: NITTO BOSEKI CO., LTD., Fukushima (JP)

(72) Inventor: Yosuke Nukui, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 18/692,530

(22) PCT Filed: Oct. 4, 2022

(86) PCT No.: PCT/JP2022/037176
§ 371 (c)(1),
(2) Date: Mar. 15, 2024

(87) PCT Pub. No.: WO2023/127220
PCT Pub. Date: Jul. 6, 2023

(65) Prior Publication Data
US 2024/0300845 A1  Sep. 12, 2024

(30) Foreign Application Priority Data

Dec. 27, 2021  (JP) ................................. 2021-212174

(51) Int. Cl.
| | | |
|---|---|---|
| *C03B 37/04* | (2006.01) | |
| *C03C 1/00* | (2006.01) | |
| *C03C 3/087* | (2006.01) | |
| *C03C 3/097* | (2006.01) | |

(52) U.S. Cl.
CPC .............. *C03B 37/04* (2013.01); *C03C 1/002* (2013.01); *C03C 3/087* (2013.01); *C03C 3/097* (2013.01)

(58) Field of Classification Search
None
See application file for complete search history.

(56) References Cited

U.S. PATENT DOCUMENTS

| | | | |
|---|---|---|---|
| 2007/0179237 A1 | | 8/2007 | Sekine |
| 2014/0364554 A1 | | 12/2014 | Nonaka et al. |
| 2023/0399252 A1 | * | 12/2023 | Nukui ................ C08K 7/14 |
| 2024/0217861 A1 | * | 7/2024 | Nukui ................ C03B 37/04 |

FOREIGN PATENT DOCUMENTS

| | | | | |
|---|---|---|---|---|
| JP | 10085704 A | * | 4/1998 | ............. C03B 3/02 |
| JP | 2003-055475 A | | 2/2003 | |
| JP | 2014-234319 A | | 12/2014 | |
| JP | 2016-113349 A | | 6/2016 | |
| JP | 2016-117628 A | | 6/2016 | |
| WO | 2005/110695 A1 | | 11/2005 | |
| WO | 2013/084892 A1 | | 6/2013 | |

OTHER PUBLICATIONS

WO 2023/276619 machine translation, Nukui et al. Glass Composition for Glass Fibers, Glass Fiber, and Glass Fiber-Reinforced Resin Molded Article, Jan. 2023 (Year: 2023).*
JP10-85704 machine translation, Kasai et al., FRP Waste Treatment, Apr. 1998 (Year: 1998).*
PCT/ISA/210 from International Application PCT/JP2022/037176 with the English translation thereof.

* cited by examiner

*Primary Examiner* — Queenie S Dehghan
(74) *Attorney, Agent, or Firm* — Carrier, Shende & Associates P.C.; Fulchand P. Shende; Joseph P. Carrier

(57) ABSTRACT

A method for manufacturing glass long fiber using recovered glass fiber, capable of manufacturing glass long fiber in which a recycle rate is increased, increase of a liquid phase temperature of molten glass and narrowing of an operating temperature range of the molten glass are suppressed, and a spinning temperature is low. The method includes a glass melting step of melting a glass raw material containing glass fiber recovered from a glass fiber-reinforced resin molded product, and a glass fiber mineral material to obtain molten glass; and a spinning step of spinning the molten glass to obtain glass long fiber, and a content of the recovered glass fiber in the glass raw material is in the range of 11 to 75% by mass, and differences in the contents of $SiO_2$, $Al_2O_3$, $B_2O_3$, and CaO between the glass fiber mineral material and the recovered glass fiber satisfy a prescribed relationship.

5 Claims, No Drawings

LONG GLASS FIBER MANUFACTURING METHOD, AND LONG GLASS FIBER

TECHNICAL FIELD

The present invention relates to a method for manufacturing long glass fiber, and long glass fiber.

BACKGROUND ART

Conventionally, glass fiber-reinforced resin molded products have been widely used as metal substitute materials such as automobile parts, because they make a contribution to environmental load reduction as a result of improved fuel efficiency associated with weight reduction.

With a growing interest in environmental issues in recent years, in order to reduce the amount of wastes, it is expected to recycle glass fiber recovered from used glass fiber-reinforced resin molded products. Patent Literature 1 describes a method for manufacturing glass fiber-reinforced plastic sheets by recycling glass fiber recovered from glass fiber-reinforced resin molded products by melting resins (hereinafter, sometimes referred to as the "recovered glass fiber").

The present inventor has provided a method for manufacturing glass long fiber by melting and spinning, for obtaining long fiber, a raw material obtained by mixing glass fiber recovered from glass fiber-reinforced resin molded products with a plurality of types of ores, or a glass fiber mineral material, that is, a material purified from an ore (Patent Literature 2).

From the viewpoint of reducing the amount of wastes, it is expected to increase the amount of recovered glass fiber used in the total amount of a glass raw material (hereinafter, sometimes referred to as the "recycle rate"). In a method for manufacturing glass long fiver using recovered glass fiber, however, the following has been found: when the recycle rate is high in the manufacturing method, since the content of components except for glass fiber is increased, the liquid phase temperature of molten glass obtained by melting a glass raw material is increased and an operating temperature range of the molten glass is narrowed, and hence the spinnability of the molten glass is reduced as compared with those in a method for manufacturing glass long fiber using only a glass fiber mineral material. Besides, depending on a glass composition of glass fiber to be manufactured, the spinning temperature (1000 poise temperature) is so increased that a large amount of energy is required for keeping the furnace at a high temperature, and therefore, the environmental load is disadvantageously increased even if the recycle rate is increased.

CITATION LIST

Patent Literature

Patent Literature 1: Japanese Patent Laid-Open No. 2003-55475
Patent Literature 2: Japanese Patent Application No. 2021-107957

SUMMARY OF INVENTION

Technical Problem

In the method for manufacturing glass long fiber using recovered glass fiber, manufacture of glass long fiber having a low spinning temperature with a recycle rate increased, and with increase of a liquid phase temperature of the molten glass and narrowing of an operating temperature range of the molten glass suppressed has been desired, but such a method for manufacturing glass long fiber has not been provided. A problem to be solved by the present invention is to provide a method for manufacturing glass long fiber using recovered glass fiber, capable of manufacturing glass long fiber having a low spinning temperature, with a recycle rate increased, and with increase of a liquid phase temperature of the molten glass and narrowing of an operating temperature range of the molten glass suppressed.

Solution to Problem

The present inventor has made studies in consideration of the above-described problems, resulting in finding the following: when recovered glass fiber and a glass fiber mineral material have different glass compositions satisfying a prescribed relationship, the spinning temperature is reduced with increase of the liquid phase temperature of the molten glass and narrowing of the operation temperature range of the molten glass suppressed. The present invention has been accomplished based on these findings.

The present invention provides a method for manufacturing glass long fiber, including: a glass melting step of melting a glass raw material containing glass fiber recovered from a glass fiber-reinforced resin molded product, and a glass fiber mineral material to obtain molten glass; and
a spinning step of spinning the molten glass to obtain glass long fiber,
wherein a content of the glass fiber recovered from the glass fiber-reinforced resin molded product in the glass raw material is in the range of 11 to 75% by mass, and the following expression (1) is satisfied:

$$5.2 \leq S+A-B-C \leq 46.9 \tag{1}$$

wherein S, A, B, and C are defined as follow:
S=[a content (% by mass) of $SiO_2$ with respect to the total amount of the glass fiber mineral material]−[a content (% by mass) of $SiO_2$ with respect to the total amount of the glass fiber recovered from the glass fiber-reinforced resin molded product];
A=[a content (% by mass) of $Al_2O_3$ with respect to the total amount of the glass fiber mineral material]−[a content (% by mass) of $Al_2O_3$ with respect to the total amount of the glass fiber recovered from the glass fiber-reinforced resin molded product];
B=[a content (% by mass) of $B_2O_3$ with respect to the total amount of the glass fiber mineral material]−[a content (% by mass) of $B_2O_3$ with respect to the total amount of the glass fiber recovered from the glass fiber-reinforced resin molded product]; and
C=[a content (% by mass) of CaO with respect to the total amount of the glass fiber mineral material]−[a content (% by mass) of CaO with respect to the total amount of the glass fiber recovered from the glass fiber-reinforced resin molded product].

According to the method for manufacturing glass long fiber of the present invention, glass long fiber can be manufactured with a recycle rate increased, with increase of a liquid phase temperature and narrowing of an operating temperature range of the molten glass suppressed, and with a spinning temperature of the molten glass reduced.

In the method for manufacturing glass long fiber of the present invention, it is preferable that the following expression (2) is satisfied:

$$10.8 \leq S+A-B-C \leq 34.3 \tag{2}$$

wherein S, A, B, and C are defined the same as above.

When S, A, B, and C satisfy the expression (2), the spinning temperature of the molten glass is further reduced, so that glass long fiber in which reduction of the elastic modulus of the glass fiber is suppressed can be manufactured.

A content of the glass fiber recovered from the glass fiber-reinforced resin molded product in the glass raw material is preferably in the range of 15 to 75% by mass, and more preferably in the range of 15 to 60% by mass. When the content falls in this range, glass long fiber can be manufactured with the liquid phase temperature of the molten glass reduced.

In the method for manufacturing glass long fiber of the present invention, it is more preferable that the following expression (3) is satisfied:

$$14.9 \leq S+A-B-C \leq 32.4 \qquad (3)$$

wherein S, A, B, and C are defined the same as above.

When S, A, B, and C satisfy the expression (3), glass long fiber can be manufactured with the increase of the liquid phase temperature and the narrowing of the operating temperature range of the molten glass further suppressed.

In the method for manufacturing glass long fiber of the present invention, it is further preferable that the following expression (4) is satisfied:

$$21.9 \leq S+A-B-C \leq 30.4 \qquad (4)$$

wherein S, A, B, and C are defined the same as above.

When S, A, B, and C satisfy the expression (4), glass long fiber can be manufactured with the spinning temperature of the molten glass particularly reduced.

Furthermore, the present invention is glass long fiber, obtained by melting and spinning a glass raw material containing glass fiber recovered from a glass fiber-reinforced resin molded product, and a glass fiber mineral material, wherein a content of the glass fiber recovered from the glass fiber-reinforced resin molded product in the glass raw material is in the range of 11 to 75% by mass, and the above-described expression (1) is satisfied, and the glass long fiber is spun in such a manner as to contain, with respect to a total amount of the glass long fiber, $SiO_2$ in the range of 48.00 to 62.00% by mass, $Al_2O_3$ in the range of 12.00 to 21.40% by mass, $B_2O_3$ in the range of 0.10 to 15.00% by mass, CaO in the range of 10.00 to 22.50% by mass, MgO in the range of 1.30 to 10.00% by mass, and $P_2O_5$, $TiO_2$, and ZnO in the range of 0.01 to 10.00% by mass in total. The glass long fiber of the present invention is glass long fiber in which a recycle rate of a raw material is high, the spinning temperature of the molten glass is reduced, and the increase of the liquid phase temperature of the molten glass and the narrowing of the operating temperature range of the molten glass are suppressed.

DESCRIPTION OF EMBODIMENTS

An embodiment of the present invention will now be described in more detail.

A method for manufacturing glass long fiber of the present embodiment includes a glass melting step of melting a glass raw material containing recovered glass fiber and a glass fiber mineral material to obtain molten glass, and a spinning step of spinning the molten glass to obtain glass long fiber.

Glass long fiber of the present embodiment is obtained by melting and spinning a glass raw material containing a recovered glass fiber and a glass fiber mineral material.

[Glass Fiber-Reinforced Resin Molded Product]

The glass fiber-reinforced resin molded product is obtained, for example, by kneading chopped strands constituted by glass filaments of glass fiber bundled and having a predetermined length and a thermoplastic resin in a twin-screw kneader to obtain resin pellets, and then conducting injection molding using the obtained resin pellets. The glass fiber-reinforced resin molded product also may be one obtained by a known molding method such as an injection compression molding method, a two-color molding method, a hollow molding method, a foam molding method (including a supercritical fluid foam molding method), an insert molding method, an in-mold coating molding method, an extrusion molding method, a sheet molding method, a thermoforming method, a rotational molding method, a laminate molding method, a press molding method, a blow molding method, a stamping molding method, an infusion method, a hand lay-up method, a spray-up method, a resin transfer molding method, a sheet molding compound method, a bulk molding compound method, a pultrusion method, and a filament winding method.

<Glass Fiber>

The glass composition of glass forming the glass fiber in the glass fiber-reinforced resin molded product is not particularly limited. Examples of the glass composition that may be taken by the glass fiber include the most common E glass composition, an acid-resistant glass composition, a high strength and high modulus glass composition, a high modulus and easily-producible glass composition, and a low dielectric constant and low dielectric tangent glass composition. From the viewpoint of commonness, the glass composition of the glass forming the glass fiber in the glass fiber-reinforced resin product is preferably an E glass composition or an acid-resistant glass composition. Besides, the glass composition of the glass forming the glass fiber in the glass fiber-reinforced resin product is more preferably an E glass composition because the distribution amount of this composition is so large and hence the effect thereof on environmental load reduction is great.

The E glass composition is a composition including $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 0.0 to 10.0% by mass with respect to the total amount of the glass fiber.

The acid-resistant glass composition is a composition including $SiO_2$ in the range of 52.0 to 62.0% by mass, $Al_2O_3$ in the range of 12.0 to 16.0% by mass, and MgO and CaO in the range of 16.0 to 30.0% by mass in total with respect to the total amount of the glass fiber.

The high strength and high modulus glass composition is a composition including $SiO_2$ in the range of 60.0 to 70.0% by mass, $Al_2O_3$ in the range of 20.0 to 30.0% by mass, MgO in the range of 5.0 to 15.0% by mass, $Fe_2O_3$ in the range of 0 to 1.5% by mass, and $Na_2O$, $K_2O$, and $Li_2O$ in the range of 0 to 0.2% by mass in total with respect to the total amount of the glass fiber.

The high modulus and easily-producible glass composition is a composition including $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, $B_2O_3$ in the range of 0.5 to 1.5% by mass with respect to the total amount of the glass fiber, and including $SiO_2$, $Al_2O_3$, MgO, and CaO of 98.0% by mass or more in total.

The low dielectric constant and low dielectric tangent glass composition is a composition including $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass with respect to the total amount of the glass fiber.

<Resin>

Examples of the resin forming the glass fiber-reinforced resin molded product can include a thermoplastic resin or a thermosetting resin, but from the viewpoint of recyclability of the resin per se, a thermoplastic resin is preferred. Examples of the thermoplastic resin forming the glass fiber-reinforced resin molded product can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Examples of the polyethylene include high density polyethylene (HDPE), medium density polyethylene, low density polyethylene (LDPE), linear low density polyethylene (LLDPE), and ultra high molecular weight polyethylene.

Examples of the polypropylene include isotactic polypropylene, atactic polypropylene, and syndiotactic polypropylene.

Examples of the polystyrene include general-purpose polystyrene (GPPS) which is an atactic polystyrene having an atactic structure, high impact polystyrene (HIPS) with a rubber component added to GPPS, and syndiotactic polystyrene having syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, and a graft copolymer obtained by graft polymerization of a vinyl chloride monomer to a polymer polymerized by a conventionally known method such as an emulsion polymerization method, a suspension polymerization method, a micro suspension polymerization method, or a bulk polymerization method.

Examples of the polyamide can include one of components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 6I), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polytetramethylene isophthalamide (polyamide 4I), polybis (3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), polybis(3-methyl-4-aminohexyl) methanetetradecamide (polyamide PACM14), and a copolymer obtained by a combination of a plurality of components of two or more thereof.

Examples of the polyacetal include a homopolymer with oxymethylene units as the main repeating unit, and a copolymer mainly consisting of oxymethylene units and containing oxyalkylene units having 2 to 8 adjacent carbon atoms in the main chain.

An example of the polyethylene terephthalate includes a polymer obtained by polycondensation of terephthalic acid or a derivative thereof with ethylene glycol.

An example of the polybutylene terephthalate includes a polymer obtained by polycondensation of terephthalic acid or a derivative thereof with 1,4-butanediol.

An example of the polytrimethylene terephthalate includes a polymer obtained by polycondensation of terephthalic acid or a derivative thereof with 1,3-propanediol.

Examples of the polycarbonate include a polymer obtained by a transesterification method in which a dihydroxydiaryl compound is reacted with a carbonate such as diphenyl carbonate in a molten state; and a polymer obtained by a phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether can include: a polymer alloy of poly(2,6-dimethyl-1,4-phenylene) ether and polystyrene; a polymer alloy of poly(2,6-dimethyl-1,4-phenylene) ether and a styrene/butadiene copolymer; a polymer alloy of poly(2,6-dimethyl-1,4 phenylene) ether and a styrene/maleic anhydride copolymer, a polymer alloy of poly(2,6-dimethyl-1,4-phenylene) ether and polyamide; and a polymer alloy of poly(2,6-dimethyl-1,4-phenylene) ether and styrene/butadiene/acrylonitrile copolymer.

Examples of the polyaryl etherketone can include polyetherketone (PEK), polyetheretherketone (PEEK), polyetherketoneketone (PEKK), and polyetheretherketoneketone (PEEKK).

An example of the liquid crystal polymer (LCP) includes a polymer (copolymer) composed of at least one structural unit selected from aromatic hydroxycarbonyl units which are thermotropic liquid crystal polyesters, aromatic dihydroxy units, aromatic dicarbonyl units, aliphatic dihydroxy units, aliphatic dicarbonyl units and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid include poly-L-lactic acid which is a homopolymer of L-lactic acid, poly-D-lactic acid which is a homopolymer of D-lactic acid, and a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

At least one of these thermoplastic resins is used.

Examples of the thermosetting resin forming the glass fiber-reinforced resin molded product of the present embodiment can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

<Additive>

The glass fiber-reinforced resin molded product may include various additives in addition to the glass fiber and resin. Examples of the various additives can include a flame retardant, a colorant, a mold release agent, an antioxidant, a UV absorber, an antistatic agent, a nucleating agent, a plasticizer, a filler, and a modifier.

Examples of the flame retardant include phosphorus-based flame retardants such as non-halogen phosphate esters, halogen-containing phosphate esters, non-halogen condensed phosphate esters, halogen-containing condensed phosphate esters, polyphosphate salts, and red phosphorus, bromine-based flame retardants such as TBA (tetrabromobisphenol A), DBDPO (decabromodiphenyl ether), OCTA (octabromodiphenyl oxide), and TBP (tribromophenol), and inorganic flame retardants such as aluminum hydroxide, antimony trioxide, tin oxide, tin hydroxide, molybdenum oxide, antimony pentoxide, and magnesium hydroxide.

Examples of the colorant include titanium oxide, zinc oxide, zinc sulfide, and carbon black.

Examples of the mold release agent include stearic acid talc, metal soap, polyethylene wax, ethylene-bis-stearic amide, EDA (ethylenediamine), EBA (ethylene-bis-stearic acid amide), a higher fatty acid sodium salt, and a higher fatty acid potassium salt.

Examples of the antioxidant include phenolic antioxidants, amine-based antioxidants, sulfur-based antioxidants, and phosphorus-based antioxidants.

Examples of the UV absorber include salicylate-based UV absorbers, benzophenone-based UV absorbers, benzotriazole-based UV absorbers, cyanoacrylate-based UV absorbers, nickel chelate-based UV absorbers, and hindered amine-based UV absorbers.

Examples of the antistatic agent include anionic surfactants, cationic surfactants, nonionic surfactants, and amphoteric surfactants.

Examples of the nucleating agent include talc, dibenzylidene sorbitol, and a ß-crystal nucleating agent.

Examples of the plasticizer include phthalic acid-based plasticizers such as DOP (dioctyl phthalate), DBP (dibutyl phthalate), DHP (diheptyl phthalate), DIDP (diisodecyl phthalate), and DINP (diisononyl phthalate), fatty acid-based plasticizers, phosphoric acid-based plasticizers such as TCP (tricresyl phosphate), TMP (trimethyl phosphate), and TEP (triethyl phosphate), adipic acid-based plasticizers such as DOA (dioctyl adipate), DINA (diisononyl adipate), and DIDA (diisodecyl adipate), polyester-based plasticizers, and epoxy-based plasticizers.

Examples of the filler can include talc, mica, glass flakes, glass beads, and calcium carbonate.

Examples of the modifier can include polybutadiene, a styrene-butadiene copolymer, a styrene-butadiene-styrene block copolymer, an acrylonitrile-butadiene-styrene copolymer, a methyl methacrylate-butadiene-styrene copolymer, a methyl methacrylate-acrylonitrile-butadiene-styrene copolymer, a methyl methacrylate-butadiene copolymer, an acrylonitrile-styrene-acryl rubber copolymer, an acrylonitrile-ethylene propylene rubber-styrene copolymer, a methyl methacrylate-acryl rubber copolymer, a methyl methacrylate-acryl rubber-styrene copolymer, a methyl methacrylate-acryl-butadiene rubber copolymer, a methyl methacrylate-acryl-butadiene rubber-styrene copolymer, a methyl methacrylate-(acryl-silicone IPN rubber) copolymer, and natural rubber.

<Recovered Glass Fiber>

The glass fiber is recovered from the glass fiber-reinforced resin molded product, for example, by heating the glass fiber-reinforced resin molded product under a condition of 450 to 800° C. for 0.5 to 8 hours to burn the thermoplastic resin included in the glass fiber-reinforced resin molded product, or dissolving the resin included in the glass fiber-reinforced resin molded product in a solvent such as benzyl alcohol.

The recovered glass fiber recovered as mentioned above includes organic matter derived from the glass fiber-reinforced resin molded product and organic matter used in recovering glass fiber from the glass fiber-reinforced resin molded product remaining in a trace amount on the surface thereof. The loss on ignition of the recovered glass fiber is, for example, in the range of 0.001 to 0.500% by mass, preferably in the range of 0.002 to 0.400% by mass, more preferably in the range of 0.003 to 0.300% by mass, still more preferably in the range of 0.004 to 0.200% by mass, still more preferably in the range of 0.005 to 0.115% by mass, particularly preferably in the range of 0.010 to 0.100% by mass, especially preferably in the range of 0.015 to 0.075% by mass, and most preferably in the range of 0.020 to 0.060% by mass.

Here, the loss on ignition is an index indicating the amount of organic matters remaining in a trace amount on the surface of the recovered glass fiber and can be measured according to JIS R3420:2013.

The number average fiber length of the recovered glass fiber is in the range of 5 to 5000 μm, for example. From the viewpoint of meltability of the molten glass after charging into a melting furnace, the number average fiber length of the recovered glass fiber is preferably in the range of 10 to 500 μm, more preferably in the range of 15 to 500 μm, still more preferably in the range of 20 to 450 μm, markedly preferably in the range of 25 to 400 μm, particularly preferably in the range of 30 to 350 μm, especially preferably in the range of 35 to 330 μm, and most preferably in the range of 40 to 300 μm. The recovered glass fiber, after being recovered from the glass fiber-reinforced resin molded product, may be pulverized to a predetermined length in a pulverizer such as ball mill. In this case, the number average fiber length of the recovered glass fiber means the number average fiber length of the recovered glass fiber after pulverization.

Here, the number average fiber length of the recovered glass fiber can be calculated by the following method. First, the recovered glass fiber is transferred to a glass petri dish, and the recovered glass fiber is dispersed using acetone on the surface of the petri dish. Subsequently, the fiber length of 1000 or more recovered glass fibers dispersed on the petri dish surface is measured using a stereoscopic microscope, and the average value thereof is calculated to determine the number average fiber length of the recovered glass fiber.

The recovered glass fiber may include components, except for the glass fiber, derived from additives contained in the glass fiber-reinforced resin molded product in a trace amount. Examples of the components except for the glass fiber include a metal oxide such as zinc oxide or titanium oxide, a non-metal oxide such as phosphorus pentoxide, and an organic matter. Such metal oxide and non-metal oxide affect the spinnability of the molten glass.

In the method for manufacturing glass long fiber of the present embodiment, the glass raw material contains the recovered glass fiber in the range of 11 to 75% by mass. When the content of the recovered glass fiber in the glass raw material is less than 11% by mass, the recycle rate in the method for manufacturing glass long fiber is too low. On the other hand, when the content of the recovered glass fiber in the glass raw material is larger than 75% by mass, the liquid phase temperature of the molten glass is so high that the spinnability of the molten glass is reduced.

The glass raw material contains the recovered glass fiber in the range of preferably 15 to 75% by mass, and more preferably 15 to 60% by mass. When the content of the recovered glass fiber falls in this range, the liquid phase temperature of the glass fiber of the present embodiment can be 1250° C. or less. The glass raw material contains the recovered glass fiber more preferably in the range of 17 to 50% by mass, contains the recovered glass fiber further preferably in the range of 20 to 45% by mass, contains the recovered glass fiber particularly preferably in the range of 26 to 42% by mass, and contains the recovered glass fiber most preferably in the range of 30 to 40% by mass.

<Glass Fiber Mineral Material>

The glass fiber mineral material is constituted by at least one of a plurality of types of ores, and materials purified from these ores (hereinafter, sometimes referred to as the "ore-derived purified material"). Based on components of the ores and the ore-derived purified materials, the types of the ores and the ore-derived purified materials, and a content ratio of each of the ores, and the ore-derived purified materials can be determined so as to attain a desired glass composition as a whole (hereinafter, sometimes referred to as the "designed glass composition").

Examples of the ore include silica sand, feldspar, clay, and limestone. Examples of the ore-derived purified material include silica powder, dolomite, talc, clay, alumina, and soda ash.

<Glass Composition of Recovered Glass Fiber and Glass Fiber Mineral Material>

In the case of comparison of the glass composition of the recovered glass fiber with the glass composition of the glass fiber mineral material, differences in the contents of $SiO_2$, $Al_2O_3$, $B_2O_3$, and CaO satisfy the relationship represented by the following expression (1):

$$5.2 \leq S+A-B-C \leq 46.9 \tag{1}$$

wherein

S=[a content (% by mass) of $SiO_2$ with respect to the total amount of the glass fiber mineral material]−[a content (% by mass) of $SiO_2$ with respect to the total amount of the glass fiber recovered from the glass fiber-reinforced resin molded product];

A=[a content (% by mass) of $Al_2O_3$ with respect to the total amount of the glass fiber mineral material]−[a content (% by mass) of $Al_2O_3$ with respect to the total amount of the glass fiber recovered from the glass fiber-reinforced resin molded product];

B=[a content (% by mass) of $B_2O_3$ with respect to the total amount of the glass fiber mineral material]−[a content (% by mass) of $B_2O_3$ with respect to the total amount of the glass fiber recovered from the glass fiber-reinforced resin molded product]; and C=[a content (% by mass) of CaO with respect to the total amount of the glass fiber mineral material]-[a content (% by mass) of CaO with respect to the total amount of the glass fiber recovered from the glass fiber-reinforced resin molded product].

Here, regarding the contents of the respective components of the recovered glass fiber and the glass fiber mineral material, the content of Li as the light element can be measured with an ICP emission spectroscopic analyzer, and the contents of the other elements can be measured with a wavelength dispersive X-ray fluorescence analyzer.

As the measurement method, first, a glass batch (prepared by mixing a glass raw material) or glass fiber (that is used, if an organic matter attaches to a glass fiber surface, or if the glass fiber is contained as a reinforcing material in an organic matter (resin), after removing the organic matter, for example, by heating in a muffle furnace at 300 to 650° C. for about 0.5 to 24 hours, for example) is placed in a platinum crucible, and melted in an electric furnace with stirring while being held at 1550° C. for 4 hours and at 1650° C. for 2 hours for the glass batch, and with stirring while being held at a temperature of 1550° C. for 6 hours for the glass fiber, and thus, homogeneous molten glass is obtained. Next, the obtained molten glass is poured onto a carbon plate to produce a glass cullet, and then pulverized and powdered into glass powder. Regarding Li as a light element, the resulting glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above-described contents of the respective components can be determined from these numerical values.

$SiO_2$ and $Al_2O_3$ of the glass fiber mineral material respectively make rigid the network of glass, and hence make a contribution to increase of the spinning temperature of the molten glass and improvement of the elastic modulus of the glass long fiber. On the other hand, $B_2O_3$ and CaO of the glass fiber mineral material respectively tend to reduce the viscosity of the molten glass. Besides, when a difference in the glass composition between the glass fiber mineral material and the recovered glass fiber is small, the influence of an organic matter and an inorganic matter remaining in a trace amount in the recovered glass fiber is relatively large, which increases the liquid phase temperature and the spinning temperature of the molten glass. As a result, when S+A−B−C satisfies the above-described expression (1), glass long fiber can be manufactured with the recycle rate increased, with the increase of the liquid phase temperature and the narrowing of the operating temperature range of the molten glass suppressed, and with the spinning temperature of the molten glass reduced. When S+A−B−C is less than 5.2, a liquid phase temperature deterioration degree of the molten glass is too high. On the other hand, when S+A−B−C is larger than 46.9, the spinning temperature of the molten glass is too high.

Specifically, when S+A−B−C satisfies the above-described expression (1), the spinning temperature can be 1400° C. or less, the liquid phase temperature deterioration degree of the molten glass described below can be 50° C. or less, and an operating temperature range deterioration degree described below can be 80° C. or less in the method for manufacturing glass long fiber of the present embodiment.

Here, the liquid phase temperature deterioration degree refers to a liquid phase temperature increased when the recovered glass fiber is mixed with the glass raw material containing the glass fiber mineral material. Specifically, it is a difference between a liquid phase temperature of molten glass in a method for manufacturing glass long fiber prepared with recovered glass fiber mixed and a liquid phase temperature of molten glass molten from a glass raw material containing a glass fiber mineral material prepared without mixing recovered glass fiber.

The operating temperature range deterioration degree refers to an operating temperature range narrowed when the recovered glass fiber is mixed with a glass raw material containing a glass fiber mineral material. Specifically, it is a difference between the operating temperature range described below of molten glass molten from a glass raw material prepared without mixing recovered glass fiber and the operating temperature range described below of molten glass in the method for manufacturing glass long fiber from the glass raw material containing the glass fiber mineral material prepared with the recovered glass fiber mixed.

The operating temperature range refers to a difference between the spinning temperature and the liquid phase temperature.

It is more preferable that S+A−B−C satisfies the following expression (2):

$$10.8 \leq S+A-B-C \leq 34.3 \tag{2}$$

When the expression (2) is satisfied, glass long fiber in which the spinning temperature of the molten glass is further reduced, and reduction of the elastic modulus of glass fiber is further suppressed can be manufactured. Specifically, the elastic modulus of glass long fiber obtained by the method for manufacturing long fiber of the present embodiment can be the elastic modulus of standard E glass (88 GPa) or more. A fiber-reinforced resin molded product containing glass long fiver having the elastic modulus of 88 GPa or more is a fiber-reinforced resin molded product in which the reinforcing effect of glass long fiber is sufficiently obtained. Besides, in the method for manufacturing long fiber of the present embodiment, the spinning temperature can be 1350° C. or less.

Here, the elastic modulus of glass long fiber means a Young's modulus measured by the following method. First, glass long fiber is held at a temperature of 1550° C. for 6 hours to be melt under stirring, and thus homogeneous molten glass is obtained. Next, the obtained molten glass is poured onto a carbon plate, and the resultant is cooled to produce a glass cullet. Subsequently, the obtained glass cullet is processed into a test piece of 25 mm×25 mm×5 mm with a cutting machine such as a diamond cutter, and a grinder to measure a Young's modulus as an index of the elastic modulus by an ultrasonic pulse method in accordance with JIS R1602:1995. The value of the Young's modulus can be regarded as the same value as a value of the Young's modulus measured by using, instead of the glass cullet obtained by melting the glass long fiber, a glass cullet obtained, by the following method, from a glass raw material that is a mixture of the recovered glass fiber and the glass fiber mineral material used in manufacturing the glass long fiber, or a glass raw material prepared to have the same composition as the glass long fiber. In a method for obtaining a glass cullet from a glass raw material, the glass raw material is first placed in a platinum crucible, and the platinum crucible is held in an electric furnace at a temperature in the range of 1400 to 1650° C. for 4 hours to melt the glass raw material with stirring, and thus homogeneous molten glass is obtained. Next, the molten glass is poured onto a carbon plate, and the resultant is cooled to obtain a glass cullet.

It is further preferable that S+A−B−C satisfies the following expression (3):

$$14.9 \leq S+A-B-C \leq 32.4 \tag{3}$$

When S, A, B and C satisfy the expression (3), glass long fiber can be manufactured with the increase of the liquid phase temperature of the molten glass and the narrowing of the operating temperature range further suppressed. Specifically, in the method for manufacturing long fiber of the present embodiment, the liquid phase temperature deterioration degree can be 10° C. or less, and the operating temperature range deterioration degree can be 30° C. or less.

It is particularly preferable that S+A−B−C satisfies the following expression (4):

$$21.9 \leq S+A-B-C \leq 30.4 \tag{4}$$

When S, A, B and C satisfy the expression (4), glass long fiber having a particularly low spinning temperature of the molten glass can be manufactured. Specifically, in the method for manufacturing long fiber of the present embodiment, the spinning temperature can be 1320° C. or less.

The S is preferably 0.5 or more from the viewpoint of making a contribution to the improvement of the elastic modulus of the glass long fiber, and is preferably 12.4 or less from the viewpoint of making a contribution to the reduction of the spinning temperature. The S is more preferably in the range of 1.9 to 9.4, further preferably in the range of 2.4 to 8.0, particularly preferably in the range of 2.7 to 7.7, and most preferably in the range of 5.1 to 7.5.

The A is preferably -3.4 or more from the viewpoint of making a contribution to the improvement of the elastic modulus of the glass long fiber, and is preferably 13.9 or less from the viewpoint of making a contribution to the reduction of the spinning temperature. The A is more preferably in the range of -1.4 to 9.6, further preferably in the range of 0.3 to 8.3, particularly preferably in the range of 0.9 to 7.5, and most preferably in the range of 3.0 to 7.0.

The B is preferably -9.9 or more from the viewpoint of making a contribution to the reduction of the spinning temperature, and is preferably 17.4 or less from the viewpoint of making a contribution to the improvement of the elastic modulus of the glass long fiber. The B is more preferably in the range of -8.9 to 14.9, further preferably in the range of -7.9 to 9.9, particularly preferably in the range of -6.9 to 8.4, and most preferably in the range of -5.5 to 0.0.

The C is preferably -20.0 or more from the viewpoint of making a contribution to the reduction of the spinning temperature, and is preferably 6.9 or less from the viewpoint of making a contribution to the improvement of the elastic modulus of the glass long fiber. The C is more preferably in the range of -14.9 to 4.9, further preferably in the range of -13.4 to 5.4, particularly preferably in the range of -12.5 to 2.5, and most preferably in the range of -9.8 to -4.3.

The glass long fiber of the present embodiment is spun in such a manner as to contain, with respect to the total amount of the glass long fiber, $SiO_2$ in the range of 48.00 to 62.00% by mass, $Al_2O_3$ in the range of 12.00 to 21.40% by mass, $B_2O_3$ in the range of 0.10 to 15.00% by mass, CaO in the range of 10.00 to 22.50% by mass, MgO in the range of 1.30 to 10.00% by mass, and $P_2O_5$, $TiO_2$, and ZnO in the range of 0.01 to 10.00% by mass in total. The glass long fiber of the present embodiment contains the other components in an amount of less than 5.00% by mass, or may not contain the other components.

When the glass composition of the glass long fiber falls in the above-described range, if recovered glass fiber including common recovered glass fiber of E glass fiber and acid-resistant glass fiber is used, a difference in the composition between the glass fiber mineral material and the recovered glass fiber is not too small, and if the recycle rate of the raw material is increased, the spinning temperature of the molten glass is low, and the increase of the liquid phase temperature of the molten glass and the narrowing the operating temperature range of the molten glass are suppressed.

The glass long fiber of the present embodiment is spun in such a manner as to preferably contain, with respect to the total amount of the glass long fiber, $SiO_2$ in the range of 50.00 to 60.00% by mass, $Al_2O_3$ in the range of 13.00 to 19.00% by mass, $B_2O_3$ in the range of 0.30 to 5.00% by mass, CaO in the range of 12.00 to 20.00% by mass, MgO in the range of 2.50 to 9.00% by mass, $P_2O_5$, $TiO_2$, and ZnO in the range of 0.01 to 9.50% by mass in total, and the other components in the range of 0 to 4.00% by mass.

The glass long fiber of the present embodiment is spun in such a manner as to more preferably contain, with respect to the total amount of the glass long fiber, $SiO_2$ in the range of 51.00 to 59.00% by mass, $Al_2O_3$ in the range of 14.00 to 18.50% by mass, $B_2O_3$ in the range of 1.00 to 4.50% by mass, CaO in the range of 12.50 to 19.00% by mass, MgO in the range of 3.00 to 8.50% by mass, $P_2O_5$, $TiO_2$, and ZnO in the range of 0.01 to 9.00% by mass in total, and the other components in the range of 0 to 3.00% by mass.

The glass long fiber of the present embodiment is spun in such a manner as to further preferably contain, with respect to the total amount of the glass long fiber, $SiO_2$ in the range of 52.00 to 58.00% by mass, $Al_2O_3$ in the range of 14.50 to 18.00% by mass, $B_2O_3$ in the range of 1.50 to 4.00% by mass, CaO in the range of 13.00 to 18.00% by mass, MgO in the range of 3.50 to 8.00% by mass, $P_2O_5$, $TiO_2$, and ZnO in the range of 0.01 to 8.50% by mass in total, and the other components in the range of 0 to 2.00% by mass.

It is noted that $P_2O_5$, $TiO_2$, and ZnO are components of an additive contained in the glass fiber-reinforced resin molded product.

In the glass long fiber of the present embodiment, a total value of the absolute values of S, A, B, and C is preferably 10.6 or more from the viewpoint of making a contribution to the improvement of the spinnability of the molten glass even when the recycle rate is increased, and is preferably 46.9 or less from the viewpoint of preventing phase separation of the molten glass. The total value of the absolute values of S, A, B, and C is more preferably in the range of 12.8 to 31.1, further preferably in the range of 17.1 to 29.9, particularly preferably in the range of 18.1 to 29.4, and most preferably in the range of 22.9 to 28.9.

In one embodiment of the method for manufacturing glass long fiber of the present embodiment, the glass raw material is supplied to a melting furnace, and melted at a temperature in the range of 1400 to 1650° C., for example. Then, the molten glass thus molten is drawn from nozzle tips of a platinum bushing, the number of which is in the range of 1 to 30000, controlled at a predetermined temperature, and rapidly cooled to form glass filaments. Subsequently, the glass filaments thus formed are applied with a sizing agent or a binder using an applicator as an application apparatus. While the glass filaments in the range of 1 to 30000 are being bundled using a bundling shoe, the glass filaments are wound on a tube at a high speed using a winding apparatus to obtain glass long fiber.

Here, glass long fiber constituted by glass filaments having a flat cross-sectional shape may be obtained by using, as the nozzle tip, a nozzle tip having a non-circular shape and having at least one of a protrusion or a notch for rapidly cooling the molten glass, and controlling the temperature condition.

The glass long fiber obtained by the manufacturing method of the present embodiment has a length of at least 1000 m.

The converted fiber diameter of a glass filament constituting the glass long fiber of the present embodiment is, for example, in the range of 3.0 to 100.0 μm, preferably in the range of 4.0 to 70.0 m, more preferably in the range of 5.0 to 50.0 μm, still more preferably in the range of 6.5 μm to 40.0 μm, and particularly preferably in the range of 7.0 to 30.0μ. The converted fiber diameter of the glass filament here means the diameter of a perfect circle having an area equivalent to the area of the cross-sectional shape of the glass filament. The cross section of the glass filament means a transverse cross section perpendicular to the fiber length direction of the glass fiber.

The cross-sectional shape of a glass filament constituting the glass long fiber of the present embodiment is usually circular. When the glass filament has a flat cross-sectional shape, examples of the shape include long oval, ellipse, and rectangle. The long oval here means a rectangular shape of which short sides each are replaced with a semicircle having a diameter equivalent to the short sides.

When the glass filament constituting the glass long fiber of the present embodiment has a flat cross-sectional shape, the ratio of the major axis to the minor axis in the cross section (major axis/minor axis) is, for example, in the range of 2.0 to 10.0, and preferably in the range of 3.0 to 8.0.

The glass long fiber of the present embodiment can be processed into various forms. An example of the form that may be taken by the glass long fiber of the present embodiment after processed includes a chopped strand. The number of glass filaments constituting the chopped strand (number bundled) is preferably 1 to 20000, more preferably 50 to 10000, and still more preferably 200 to 8000. The length of the glass long fiber constituting the chopped strand is preferably 1.0 to 100.0 mm, more preferably 1.2 to 51.0 mm, still more preferably 1.5 to 30.0 mm, particularly preferably 2.0 to 15.0 mm, and most preferably 2.3 to 7.8 mm. Examples of the form that may be taken by the glass long fiber of the present embodiment after processed also include, in addition to the chopped strand, a roving constituted by 10 to 30000 glass filaments obtained without cutting the glass long fiber, and cut fiber obtained by pulverizing, with a known device such as a ball mill or a Henschel mixer, glass long fiber constituted by 1 to 20000 glass filaments into a length of 0.001 to 0.900 mm.

A glass fiber-reinforced resin molded product can be obtained by processing the glass long fiber of the present embodiment into, for example, chopped strands, kneading the chopped strands and a thermoplastic resin in a twin-screw kneader, and conducting injection molding using the obtained resin pellets. The glass fiber-reinforced resin molded product may be obtained by a known molding methods such as an injection compression molding method, a two-color molding method, a hollow molding method, a foam molding method (including a supercritical fluid foam molding method), an insert molding method, an in-mold coating molding method, an extrusion molding method, a sheet molding method, a thermoforming method, a rotational molding method, a laminate molding method, a press molding method, a blow molding method, a stamping molding method, an infusion method, a hand lay-up method, a spray-up method, a resin transfer molding method, a sheet molding compound method, a bulk molding compound method, a pultrusion method, and a filament winding method.

The glass fiber-reinforced resin molded product can be used in, for example, housings and parts such as frames of portable electronic devices including smartphones, automobile electrical parts such as battery tray covers, sensors, and coil bobbins, electronic device parts other than those for portable electronic devices, and electrical connecting terminal parts.

The glass long fiber of the present embodiment may be coated with organic matter on the surface thereof, for the purposes such as improvement of adhesiveness between glass fiber and a resin, improvement of uniform dispersibility of glass fiber in a mixture of glass fiber and a resin, and the like. Examples of the organic matter include resins such as urethane resins, epoxy resins, vinyl acetate resins, acrylic resins, modified polypropylene, particularly carboxylic acid-modified polypropylene, and a copolymer of (poly) carboxylic acid, particularly maleic acid and an unsaturated monomer, and silane coupling agents.

The glass long fiber of the present embodiment may be coated with a composition including a lubricant, a surfactant, and the like in addition to the resin or the silane coupling agent. Such a composition covers the glass long fiber of the present embodiment at a rate of 0.1 to 2.0% by mass based on the mass of glass long fiber not coated with the composition.

The glass long fiber is implemented to coat with organic matter by applying the sizing agent or the binder to the glass long fiber using a known method such as a roller applicator, for example, in the manufacturing process of the glass long fiber. The sizing agent or binder includes a solution of the resin, the silane coupling agent, or the composition. The coating of the glass long fiber is completed thereafter by drying the glass fiber to which the solution of the resin, the silane coupling agent, or the composition has been applied.

Examples of the silane coupling agent here include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

An example of the chlorosilane includes γ-chloropropyltrimethoxysilane.

Examples of the epoxysilane include γ-glycidoxypropyltrimethoxysilane and β-(3,4 epoxy cyclohexyl) ethyltrimethoxysilane.

An example of the mercaptosilane includes γ-mercaptotrimethoxysilane.

Examples of the vinylsilane include vinyl trimethoxysilane and N-β-(N-vinylbenzylaminoethyl)-γ-aminopropyltrimethoxysilane.

An example of the acrylsilane includes γ-methacryloxypropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products of animal oils, vegetable oils and hydrogenated products of vegetable oils, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

An example of the animal oil includes beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine, such as diethylenetriamine, triethylenetetramine, or tetraethylenepentamine, and a fatty acid, such as lauric acid, myristic acid, palmitic acid, or stearic acid.

Examples of the quaternary ammonium salt include alkyltrimethylammonium salts such as lauryltrimethylammonium chloride.

Examples of the surfactant can include nonionic surfactants, cationic surfactants, anionic surfactants, and amphoteric surfactants. As the surfactant, these can be used singly or in combinations of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts (such as acetates and hydrochlorides), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

EXAMPLES

The present invention will now be described in more detail based on examples, and it is noted that the present invention is not limited to these examples.

In examples and comparative examples, various physical properties were measured or calculated as follows.

<Glass Composition>

A glass raw material that is a mixture of recovered glass fiber of each of examples and comparative examples and a glass fiber mineral material was first placed in a platinum crucible, and the platinum crucible was held in an electric furnace at a temperature in the range of 1400 to 1650° C. for 4 hours to melt the glass raw material with stirring, and thus, homogeneous molten glass was obtained. Next, a glass cullet in the shape of a lump obtained by pouring the molten glass onto a carbon plate, and cooling the resultant was pulverized into a powder to obtain a glass powder. The glass powder was molded into a disk form in a press, and then the disk was subjected to quantitative analysis using a wavelength dispersive X-ray fluorescence analyzer. Results of the quantitative analysis were converted in terms of oxides to calculate the content of each component and the total amount, and the contents of respective components were determined based on these numerical values.

<Spinning Temperature>

A high temperature electric furnace equipped with a rotational brookfield viscometer (manufactured by Shibaura System Co., Ltd.) was used to melt, in a platinum crucible, the glass cullet of each of the examples and comparative examples obtained as described above to continuously measure the viscosity of molten glass with the viscometer equipped in the electric furnace with the melting temperature changed, and a temperature corresponding to rotational viscosity of 1000 poise was measured as the spinning temperature.

<Liquid Phase Temperature>

The glass cullet of each of the examples and comparative examples obtained as described above was pulverized, and 40 g of glass particles having a particle size of 0.5 to 1.5 mm thus obtained was placed in a platinum boat of 180×20×15 mm, and the resultant was heated in a tubular electric furnace provided with a temperature gradient of from 1000 to 1500° C. for 8 hours or more. Thereafter, the resultant was taken out of the tubular electric furnace, and was observed with a polarization microscope to specify a position where glass-derived crystals (devitrification) started to precipitate. The temperature within the tubular electric furnace was measured with a type B thermocouple, and the temperature at which the crystals started to precipitate was measured to determine the liquid phase temperature.

<Operating Temperature Range>

A difference between the spinning temperature and the liquid phase temperature was calculated as the operating temperature range.

<Elastic Modulus>

The glass cullet of each of the examples and comparative examples obtained as described above was processed into a test piece of 25 mm×25 mm×5 mm with a cutting machine such as a diamond cutter, and a grinder to measure the Young's modulus as an index of the elastic modulus by an ultrasonic pulse method in accordance with JIS R1602:1995.

<Liquid Phase Temperature Deterioration Degree and Operating Range Temperature Deterioration Degree>

A glass raw material was prepared from the glass fiber mineral material used in each of the examples and comparative examples without mixing recovered glass fiber, and the glass raw material was placed in a platinum crucible, and the platinum crucible was held in an electric furnace at a temperature in the range of 1400 to 1650° C. for 4 hours to melt the glass raw material with stirring, and thus, homogeneous molten glass was obtained. Next, the molten glass was poured onto a carbon plate, and the resultant was cooled to obtain a glass cullet in the shape of a lump as reference glass. A value obtained by subtracting a liquid phase temperature of molten glass obtained by melting the reference glass from a liquid phase temperature of molten glass in a method for manufacturing glass long fiber of each of the examples and comparative examples was calculated as the liquid phase temperature deterioration degree. Besides, a value obtained by subtracting an operating range temperature of the molten glass in the method for manufacturing glass long fiber of each of the examples and comparative examples from an operating range temperature of the molten glass obtained by melting the reference glass was calculated as the operating range temperature deterioration degree.

Example 1

A glass fiber-reinforced thermoplastic resin molded product was heated at 625° C. for 4 hours to burn the thermoplastic resin, and then the remaining glass fiber A was recovered. The thus recovered glass fiber A had a glass composition as shown in Table 1 below, and the number average fiber length of the recovered glass fiber A was 320 μm. With 67 parts by mass of a glass fiber mineral material D having a composition D shown in Table 2 below, 33 parts by mass of the recovered glass fiber A was mixed to obtain a glass raw material. Next, the glass raw material was placed in a platinum crucible, and the platinum crucible was held in an electric furnace at a temperature in the range of 1400 to 1650° C. for 4 hours to melt the glass raw material with stirring, and thus, homogeneous molten glass was obtained. Next, the molten glass was poured onto a carbon plate, the resultant was cooled to obtain a glass cullet in the shape of a lump, and the glass composition, the spinning temperature and the liquid phase temperature thereof were measured to calculate the operating temperature range, the liquid phase temperature deterioration degree, and the operating range temperature deterioration degree. Results are shown in Table 3 below.

Example 2

The same operation as that of Example 1 was performed except that a glass raw material was obtained by mixing 80 parts by mass of the glass fiber mineral material D with 20 parts by mass of the recovered glass fiber A. Results are shown in Table 3 below.

Example 3

The same operation as that of Example 1 was performed except that a glass raw material was obtained by mixing 50 parts by mass of the glass fiber mineral material D with 50 parts by mass of the recovered glass fiber A. Results are shown in Table 3 below.

Example 4

The same operation as that of Example 1 was performed except that recovered glass fiber C having a glass composition shown in Table 1 below was recovered. Results are shown in Table 3 below.

Example 5

The same operation as that of Example 1 was performed except that recovered glass fiber B having a glass composition shown in Table 1 below was recovered. Results are shown in Table 3 below.

Example 6

The same operation as that of Example 1 was performed except that a glass raw material was obtained by mixing 50 parts by mass of the glass fiber mineral material D with 50 parts by mass of the recovered glass fiber B. Results are shown in Table 3 below.

Example 7

The same operation as that of Example 1 was performed except that a glass fiber mineral material E having a composition E shown in Table 2 below was used. Results are shown in Table 3 below.

Example 8

The same operation as that of Example 1 was performed except that a glass raw material was obtained by mixing 50 parts by mass of the glass fiber mineral material E with 50 parts by mass of the recovered glass fiber A. Results are shown in Table 3 below.

Example 9

The same operation as that of Example 1 was performed except that a glass raw material was obtained by mixing 30 parts by mass of the glass fiber mineral material D with 70 parts by mass of the recovered glass fiber A. Results are shown in Table 4 below.

Example 10

The same operation as that of Example 1 was performed except that a glass fiber mineral material F having a composition F shown in Table 2 below was used. Results are shown in Table 4 below.

Example 11

The same operation as that of Example 1 was performed except that a glass fiber mineral material G having a composition G shown in Table 2 below was used. Results are shown in Table 4 below.

Comparative Example 1

The same operation as that of Example 1 was performed except that a glass fiber mineral material H having a composition H shown in Table 2 below was used. Results are shown in Table 4 below.

Comparative Example 2

The same operation as that of Example 1 was performed except that a glass raw material was obtained by mixing 80 parts by mass of the glass fiber mineral material H with 20 parts by mass of the recovered glass fiber A. Results are shown in Table 4 below.

Comparative Example 3

The same operation as that of Example 1 was performed except that a glass fiber mineral material I having a composition I shown in Table 2 was used. Results are shown in Table 4 below.

Reference Example 1

The same operation as that of Example 1 was performed except that a glass raw material was obtained by mixing 90 parts by mass of the glass fiber mineral material H with 10 parts by mass of the recovered glass fiber A. Results are shown in Table 4 below.

TABLE 1

| Component | Recovered Glass Fiber A | Recovered Glass Fiber B | Recovered Glass Fiber C |
|---|---|---|---|
| $SiO_2$ | 51.62 | 56.27 | 51.62 |
| $B_2O_3$ | 5.99 | 0.00 | 5.99 |
| $Al_2O_3$ | 13.54 | 13.46 | 13.54 |
| CaO | 21.58 | 21.65 | 21.58 |
| MgO | 0.95 | 2.40 | 0.95 |
| $Na_2O$ | 0.48 | 0.00 | 0.48 |
| $K_2O$ | 0.07 | 0.00 | 0.07 |
| $TiO_2$ | 0.33 | 0.00 | 0.33 |
| $Fe_2O_3$ | 0.19 | 0.19 | 0.19 |
| $F_2 + Cl_2$ | 0.67 | 0.00 | 0.67 |
| ZnO | 0.00 | 0.96 | 4.58 |
| $P_2O_5$ | 4.58 | 5.07 | 0.00 |

The components are shown in units of % by mass.

TABLE 2

|  | | Composition D | Composition E | Composition F | Composition G | Composition H | Composition I |
|---|---|---|---|---|---|---|---|
| Component | $SiO_2$ | 59.00 | 59.30 | 54.70 | 60.00 | 54.20 | 65.00 |
|  | $B_2O_3$ | 1.00 | 0.00 | 19.30 | 0.00 | 6.20 | 0.00 |
|  | $Al_2O_3$ | 18.50 | 14.20 | 14.70 | 25.00 | 14.20 | 25.00 |
|  | CaO | 11.80 | 22.80 | 4.10 | 6.00 | 22.60 | 0.00 |
|  | MgO | 9.50 | 2.50 | 4.20 | 9.00 | 1.00 | 10.00 |
|  | $Na_2O$ | 0.10 | 0.00 | 0.00 | 0.00 | 0.50 | 0.00 |
|  | $K_2O$ | 0.00 | 0.00 | 0.00 | 0.00 | 0.07 | 0.00 |
|  | $TiO_2$ | 0.00 | 0.00 | 2.00 | 0.00 | 0.00 | 0.00 |
|  | $Fe_2O_3$ | 0.10 | 0.10 | 0.10 | 0.00 | 0.35 | 0.00 |
|  | $F_2 + Cl_2$ | 0.00 | 0.00 | 0.90 | 0.00 | 0.20 | 0.00 |
|  | ZnO | 0.00 | 1.10 | 0.00 | 0.00 | 0.70 | 0.00 |
| Liquid Phase Temperature (° C.) | | 1240 | 1160 | 1070 | 1450 | 1065 | 1330 |
| Spinning Temperature (° C.) | | 1330 | 1260 | 1325 | 1470 | 1200 | 1410 |
| Operating Temperature Range (° C.) | | 90 | 100 | 255 | 20 | 135 | 80 |

The components are shown in units of % by mass. The liquid phase temperatures, the spinning temperatures, and the operating temperature ranges of molten glass respectively obtained by melting the glass fiber mineral materials D to I respectively having the compositions D to I are also shown in Table 2.

TABLE 3

|  |  | Example 1 | Example 2 | Example 3 | Example 4 | Example 5 | Example 6 | Example 7 | Example 8 |
|---|---|---|---|---|---|---|---|---|---|
| Component | $SiO_2$ | 56.56 | 57.52 | 55.30 | 56.56 | 58.09 | 57.63 | 56.76 | 55.45 |
|  | $B_2O_3$ | 2.65 | 2.00 | 3.50 | 2.65 | 0.67 | 0.50 | 1.98 | 3.00 |
|  | $Al_2O_3$ | 16.86 | 17.51 | 16.02 | 16.86 | 16.84 | 15.98 | 13.98 | 13.87 |
|  | CaO | 15.02 | 13.75 | 16.69 | 15.02 | 15.05 | 16.72 | 22.40 | 22.19 |
|  | MgO | 6.68 | 7.79 | 5.23 | 6.68 | 7.16 | 5.95 | 1.99 | 1.73 |
|  | $Na_2O$ | 0.23 | 0.18 | 0.29 | 0.23 | 0.07 | 0.05 | 0.16 | 0.24 |
|  | $K_2O$ | 0.02 | 0.01 | 0.04 | 0.02 | 0.00 | 0.00 | 0.02 | 0.04 |
|  | $TiO_2$ | 0.11 | 0.07 | 0.17 | 0.11 | 0.00 | 0.00 | 0.11 | 0.17 |
|  | $Fe_2O_3$ | 0.14 | 0.12 | 0.13 | 0.14 | 0.13 | 0.15 | 0.13 | 0.13 |
|  | $F_2 + Cl_2$ | 0.22 | 0.13 | 0.34 | 0.22 | 0.00 | 0.00 | 0.22 | 0.34 |
|  | ZnO | 0.00 | 0.00 | 0.00 | 1.51 | 0.32 | 0.48 | 0.74 | 0.55 |
|  | $P_2O_5$ | 1.51 | 0.92 | 2.29 | 0.00 | 1.67 | 2.54 | 1.51 | 2.29 |
| Mineral Material | | D | D | D | D | D | D | E | E |
| Recovered Glass Fiber | | A | A | A | C | B | B | A | A |
| Recovered Glass Fiber Content (mass %) | | 33 | 20 | 50 | 33 | 33 | 50 | 33 | 50 |
| S | | 7.4 | 7.4 | 7.4 | 7.4 | 2.7 | 2.7 | 7.7 | 7.7 |
| A | | 5.0 | 5.0 | 5.0 | 5.0 | 1.0 | 1.0 | 0.7 | 0.7 |
| B | | −5.0 | −5.0 | −5.0 | −5.0 | 5.0 | 5.0 | −6.0 | −6.0 |
| C | | −9.8 | −9.8 | −9.8 | −9.8 | −9.9 | −9.9 | 1.2 | 1.2 |
| \|S\| + \|A\| + \|B\| + \|C\| | | 27.1 | 27.1 | 27.1 | 27.1 | 18.6 | 18.6 | 15.6 | 15.6 |
| S + A − B − C | | 27.1 | 27.1 | 27.1 | 27.1 | 8.5 | 8.5 | 13.1 | 13.1 |
| Bulk Modulus (GPa) | | 93 | 94 | 92 | 94 | 94 | 92 | 89 | 88 |
| Liquid Phase Temperature (° C.) | | 1220 | 1225 | 1225 | 1225 | 1230 | 1240 | 1180 | 1185 |
| Spinning Temperature (° C.) | | 1310 | 1315 | 1300 | 1315 | 1330 | 1325 | 1240 | 1220 |
| Operating Temperature Range (° C.) | | 90 | 90 | 75 | 90 | 100 | 85 | 60 | 35 |
| Liquid Phase Temperature Deterioration Degree (° C.) | | −20 | −15 | −15 | −15 | −10 | 0 | 20 | 25 |
| Operating Temperature Range Deterioration Degree (° C.) | | 0 | 0 | 15 | 0 | −10 | 5 | 40 | 65 |

The components are shown in units of % by mass.

TABLE 4

|  |  | Example 9 | Example 10 | Example 11 | Comparative Example 1 | Comparative Example 2 | Comparative Example 3 | Reference Example 1 |
|---|---|---|---|---|---|---|---|---|
| Component | $SiO_2$ | 54.12 | 53.68 | 57.23 | 53.34 | 53.68 | 60.58 | 53.92 |
|  | $B_2O_3$ | 4.29 | 14.91 | 1.98 | 6.13 | 6.16 | 1.98 | 6.18 |

TABLE 4-continued

|  | Example 9 | Example 10 | Example 11 | Comparative Example 1 | Comparative Example 2 | Comparative Example 3 | Reference Example 1 |
|---|---|---|---|---|---|---|---|
| $Al_2O_3$ | 15.23 | 14.32 | 21.23 | 13.98 | 14.07 | 21.22 | 14.13 |
| CaO | 18.25 | 9.87 | 11.14 | 22.26 | 22.39 | 7.12 | 22.50 |
| MgO | 3.86 | 3.13 | 6.34 | 0.98 | 0.99 | 7.01 | 1.00 |
| $Na_2O$ | 0.35 | 0.16 | 0.16 | 0.49 | 0.50 | 0.16 | 0.50 |
| $K_2O$ | 0.05 | 0.02 | 0.02 | 0.07 | 0.07 | 0.02 | 0.07 |
| $TiO_2$ | 0.22 | 1.45 | 0.11 | 0.11 | 0.07 | 0.11 | 0.03 |
| $Fe_2O_3$ | 0.17 | 0.13 | 0.06 | 0.30 | 0.30 | 0.07 | 0.33 |
| $F_2 + Cl_2$ | 0.44 | 0.82 | 0.22 | 0.36 | 0.29 | 0.22 | 0.25 |
| ZnO | 0.00 | 0.00 | 0.00 | 0.47 | 0.56 | 0.00 | 0.63 |
| $P_2O_5$ | 3.02 | 1.51 | 1.51 | 1.51 | 0.92 | 1.51 | 0.46 |
| Mineral Material | D | F | G | H | H | I | H |
| Recovered Glass Fiber | A | A | A | A | A | A | A |
| Recovered Glass Fiber Content (mass %) | 70 | 33 | 33 | 33 | 20 | 33 | 10 |
| S | 7.4 | 3.1 | 8.4 | 2.6 | 2.6 | 13.4 | 2.6 |
| A | 5.0 | 1.2 | 11.5 | 0.7 | 0.7 | 11.5 | 0.7 |
| B | −5.0 | 13.3 | −6.0 | 0.2 | 0.2 | −6.0 | 0.2 |
| C | −9.8 | −17.5 | −15.6 | 1.0 | 1.0 | −21.6 | 1.0 |
| \|S\| + \|A\| + \|B\| + \|C\| | 27.1 | 35.0 | 41.4 | 4.5 | 4.5 | 52.4 | 4.5 |
| S + A − B − C | 27.1 | 8.4 | 41.4 | 2.0 | 2.0 | 52.4 | 2.0 |
| Bulk Modulus (GPa) | 89 | 82 | 93 | 88 | 88 | 95 | 88 |
| Liquid Phase Temperature (° C.) | 1270 | 1090 | 1300 | 1240 | 1140 | 1425 | 1070 |
| Spinning Temperature (° C.) | 1290 | 1315 | 1360 | 1200 | 1200 | 1440 | 1200 |
| Operating Temperature Range (° C.) | 20 | 225 | 60 | −40 | 60 | 15 | 130 |
| Liquid Phase Temperature Deterioration Degree (° C.) | 30 | 20 | 0 | 175 | 75 | −25 | 5 |
| Operating Temperature Range Deterioration Degree (° C.) | 70 | 30 | 15 | 175 | 75 | 5 | 5 |

The components are shown in units of % by mass.

In the methods for manufacturing the glass long fiber of Comparative Examples 1 and 2 in which S+A−B−C was smaller than the prescribed range, the liquid phase temperature deterioration degree and the operating temperature range deterioration degree of the molten glass were large. In the method for manufacturing the glass long fiber of Comparative Example 1, the liquid phase temperature of the molten glass was higher than the spinning temperature thereof. In the method for manufacturing the glass long fiber of Comparative Example 3 in which S+A−B−C was larger than the prescribed range, the liquid phase temperature and the spinning temperature of the molten glass were high, and the operating temperature range thereof was narrow.

On the other hand, in the methods for manufacturing glass long fiber of Examples 1 to 11 in which S+A−B−C was in the prescribed range, the liquid phase temperature and the spinning temperature of the molten glass were low, the operating temperature range was wide, and the liquid phase temperature deterioration degree and the operating temperature range deterioration degree were low.

The invention claimed is:

1. A method for manufacturing glass long fiber, comprising:
a glass melting step of melting a glass raw material containing glass fiber recovered from a glass fiber-reinforced resin molded product, and a glass fiber mineral material to obtain molten glass; and
a spinning step of spinning the molten glass to obtain glass long fiber,
wherein a content of the glass fiber recovered from the glass fiber-reinforced resin molded product in the glass raw material is in a range of 11 to 75% by mass, the glass long fiber is spun in such a manner as to contain, with respect to a total amount of the glass long fiber, $SiO_2$ in a range of 48.00 to 62.00% by mass, $Al_2O_3$ in a range of 12.00 to 21.40% by mass, $B_2O_3$ in a range of 0.10 to 15.00% by mass, CaO in a range of 10.00 to 22.50% by mass, MgO in a range of 1.30 to 10.00% by mass, and $P_2O_5$, $TiO_2$, and ZnO in a range of 0.01 to 10.00% by mass in total, and following expression (1) is satisfied:

$$5.2 \leq S+A-B-C \leq 46.9 \quad (1)$$

wherein S, A, B, and C are defined as follow:

S=[a content (% by mass) of $SiO_2$ with respect to a total amount of the glass fiber mineral material]−[a content (% by mass) of $SiO_2$ with respect to a total amount of the glass fiber recovered from the glass fiber-reinforced resin molded product];

A=[a content (% by mass) of $Al_2O_3$ with respect to the total amount of the glass fiber mineral material]−[a content (% by mass) of $Al_2O_3$ with respect to the total amount of the glass fiber recovered from the glass fiber-reinforced resin molded product];

B=[a content (% by mass) of $B_2O_3$ with respect to the total amount of the glass fiber mineral material]−[a content (% by mass) of $B_2O_3$ with respect to the total amount of the glass fiber recovered from the glass fiber-reinforced resin molded product]; and C=[a content (% by mass) of CaO with respect to the total amount of the glass fiber mineral material]−[a content (% by mass) of CaO with respect to the total amount of the glass fiber recovered from the glass fiber-reinforced resin molded product].

2. The method for manufacturing glass long fiber according to claim 1, wherein following expression (2) is satisfied:

$$10.8 \leq S+A-B-C \leq 34.3 \tag{2}$$

wherein S, A, B, and C are defined the same as above.

3. The method for manufacturing glass long fiber according to claim 1, wherein the content of the glass fiber recovered from the glass fiber-reinforced resin molded product in the glass raw material is in a range of 15 to 60% by mass.

4. The method for manufacturing glass long fiber according to claim 1, wherein following expression (3) is satisfied:

$$14.9 \leq S+A-B-C \leq 32.4 \tag{3}$$

wherein S, A, B, and C are defined the same as above.

5. The method for manufacturing glass long fiber according to claim 4, wherein following expression (4) is satisfied:

$$21.9 \leq S+A-B-C \leq 30.4 \tag{4}$$

wherein S, A, B, and C are defined the same as above.

* * * * *